US006298328B1

(12) United States Patent
Healy et al.

(10) Patent No.: US 6,298,328 B1
(45) Date of Patent: Oct. 2, 2001

(54) APPARATUS, METHOD, AND SYSTEM FOR SIZING MARKETS

(75) Inventors: Eileen M. Healy, Walnut Creek; Gregory T. Dunn, Pleasanton, both of CA (US)

(73) Assignee: Telecompetition, Inc., San Ramon, CA (US)

(*) Notice: Subject to any disclaimer, the term of this patent is extended or adjusted under 35 U.S.C. 154(b) by 0 days.

(21) Appl. No.: 09/048,731

(22) Filed: Mar. 26, 1998

(51) Int. Cl.⁷ ....................................................... G06F 17/00
(52) U.S. Cl. ................................................ 705/10; 705/1
(58) Field of Search ........................................ 705/10, 2, 1

(56) References Cited

U.S. PATENT DOCUMENTS

| | | | | |
|---|---|---|---|---|
| 5,155,591 | * | 10/1992 | Wachob | 348/9 |
| 5,299,115 | * | 3/1994 | Fields et al. | 705/10 |
| 5,515,098 | * | 5/1996 | Carles | 348/8 |
| 5,521,813 | * | 5/1996 | Fox et al. | 705/10 |
| 5,541,835 | * | 7/1996 | Dextraze et al. | 705/10 |
| 5,550,746 | * | 8/1996 | Jacobs | 705/27 |
| 5,557,514 | * | 9/1996 | Seare et al. | 705/2 |
| 5,561,841 | * | 10/1996 | Markus | 455/446 |
| 5,563,783 | * | 10/1996 | Stolfo et al. | 705/8 |
| 5,596,493 | * | 1/1997 | Tone et al. | 705/10 |
| 5,613,041 | * | 3/1997 | Keeler et al. | 706/17 |
| 5,613,072 | * | 3/1997 | Hammond et al. | 705/8 |
| 5,623,679 | * | 4/1997 | Rivette et al. | 707/526 |
| 5,636,346 | * | 6/1997 | Saxe | 705/1 |
| 5,652,867 | * | 7/1997 | Barlow et al. | 705/6 |
| 5,659,724 | * | 8/1997 | Borgida et al. | 707/3 |
| 5,661,516 | * | 8/1997 | Carles | 348/8 |
| 5,721,831 | * | 2/1998 | Waits et al. | 705/10 |
| 5,778,345 | * | 7/1998 | McCartney | 705/2 |
| 5,832,456 | * | 11/1998 | Fox et al. | 705/10 |
| 5,848,396 | * | 12/1998 | Gerace | 705/10 |

OTHER PUBLICATIONS

Rose, Matthew et al, "Direct Marketing Software Guide (Guide for Software Packages for Marketing)", Direct Marketing, v52, n2, p53, Jun. 1989.*
"National Decision Systems Chooses Trinet/ABL Combination to Replace D&B Data", IDP Report, v10, n19, p. 1, Dialog File 148:Trade & Industry, Nov. 1989.*
Francese, Peter, "Managing Market Information", American Demographics, vol. 17, Issue 19, p. 56, Sep. 1995.*

* cited by examiner

Primary Examiner—Emanuel Todd Voeltz
Assistant Examiner—John W. Hayes
(74) Attorney, Agent, or Firm—John R. Leflar

(57) ABSTRACT

Using a general-purpose computer, the system allocates, tracks, and forecasts market data by product, geographic area, market segment, provider, and time period, in a way consistent with accepted regional market sizes. Inputs include regional market data, demographic, psychographic, and/or firmagraphic data, weighting coefficients, profiles, and ratings. The system allocates regional markets to subregions as defined by an area hierarchy. Allocation fractions are computed as ratios of subregional to regional rated buying populations. A subregional rated buying population is a weighted sum of rated buying populations for a set of market factors such as age or household income. A rated buying population for a particular market factor is the sum of rated buying populations for a set of categories such as age or income brackets. A rated buying population for a particular category is the product of the subregional population falling within that category and a propensity-to-buy rating for that category. Weighting coefficients are used to refine the market allocations and calibrate the system outputs to the real world. The system integrates external subregional market size values with allocated values, adjusting all related computed values so that at each level of the area hierarchy the sum of the subregional allocations still equals the accepted value for the parent region. System outputs in the form of graphs, spreadsheets, maps, or other format can be delivered electronically through various media.

112 Claims, 11 Drawing Sheets

APPARATUS, METHOD, AND SYSTEM FOR SIZING MARKETS

BACKGROUND—OBJECTS AND ADVANTAGES

This invention relates to an apparatus, method, and system for sizing markets for products or services. It applies engineering rigor to market analysis in order to satisfy a need to produce consistent, reliable, refinable localized market data. The system allocates, tracks, and forecasts market data by product, geographic area, market segment, provider, and time period, in a way consistent with accepted regional market sizes (generally national, international, or worldwide). The system provides a means of quickly and consistently allocating regional markets to subregions and computing total industry size in terms of revenues.

The system is particularly useful for (but not limited to) large worldwide industries, and especially industries experiencing deregulation, such as the telecommunications and energy industries. In this environment, infrastructure, product development, and marketing costs are so high that local market data is critical to making such investments. The system facilitates sound decisions and strategies by providing localized data. Thinking globally and acting locally requires local market intelligence.

The system has many objects and advantages. It provides a tool for individuals analyzing rapidly changing industries and product mixes. It provides a repository (database) for important industry information and enables near real-time adjustments based on current market conditions. It provides a framework for tracking dynamic markets and a means to allocate those markets in useful and novel ways. It preserves the integrity of accepted regional market sizes while providing previously unavailable subregional market sizes. It allows any number of market factors to be used in the allocation of product markets. It provides for qualitative and quantitative inputs from industry analysts or other experts knowledgeable in the particular market dynamics of the industry and the product being processed. It allows the computed data to be refined with external data in a manner that improves accuracy while maintaining data consistency. It also provides flexibility in data output methods.

Further objects and advantages will become apparent from a consideration of the ensuing description and accompanying drawings.

SUMMARY

The invention relates to an apparatus, method, and system that satisfies the need to produce consistent, reliable, refinable localized market data. A system having features of the invention uses a computer for sizing markets. In one aspect of the system, a market is sized for a subregion of a region by allocating a portion of the regional market size to the subregion. This involves inputting a market size for the region, determining a rated buying population for the subregion, determining a rated buying population for the region, and dividing the rated buying population for the subregion by the rated buying population for the region, resulting in a market allocation fraction. The market allocation fraction is multiplied by the market size for the region, resulting in a market size for the subregion.

In another aspect, the determination of the rated buying population for the subregion involves determining a rated buying population for each market factor in a set of one or more market factors, and summing all of the rated buying populations for the set of market factors.

In another aspect, the determination of the rated buying population for a market factor involves determining a rated buying population for each category in a set of categories for the market factor, and summing all of the rated buying populations for the set of categories.

In another aspect, the determination of the rated buying population for a category involves inputting a population for the category and a propensity-to-buy rating for the category, and multiplying the population for the category by the propensity-to-buy rating for the category.

In another aspect, the determination of the rated buying population for a market factor involves weighting the rated buying population for the market factor by multiplying by a weighting coefficient.

In another aspect, the determination of the rated buying population for a subregion involves weighting the rated buying population for the subregion by multiplying by a weighting coefficient.

In another aspect, the determination of the rated buying population for the region involves determining a rated buying population for each subregion in a set of mutually exclusive subregions that together include all of the region, and summing all of the rated buying populations for the set of mutually exclusive subregions.

In another aspect, market sizes for a set of one or more subregions are summed, and the sum is subtracted from the regional market size, resulting in a remaining market size for allocation. A portion of the remaining market size for a allocation is allocated to a subregion not included in that set of subregions by determining a rated buying population for the subregion, determining a rated buying population for the portion of the region not included in that set of subregions, and dividing the rated buying population for the subregion by the rated buying population for the portion of the region not included in that set of subregions, resulting in a market allocation fraction. The market allocation fraction is multiplied by the remaining market size for allocation, resulting in a market size for the subregion.

In another aspect, the determination of the rated buying population for the portion of the region not included in the set of subregions involves determining a rated buying population for each subregion in the region which is not included in the set of subregions, and summing the rated buying populations for those subregions.

In another aspect, the system creates a database of market size data for a set of one or more subregions of a region.

In another aspect, an apparatus is provided having means for performing one or more of the processes described above.

In another aspect, a program storage device, readable by a machine, contains a program of instructions executable by the machine to perform one or more of the processes described above.

In another aspect, an article having a computer-usable medium has computer-readable program code embodied in the medium for performing one or more of the processes described above.

These and other features and aspects of the system will become better understood with reference to the following description, accompanying drawings, and appended claims.

DRAWING FIGURES

DESCRIPTION

Overview

In one embodiment, the system populates a market database in five dimensions: product, geography, market segment, provider, and time. (The number of dimensions could vary in other embodiments.) In three of the dimensions, namely the geographic, market segment, and provider dimensions, the system may allocate a particular product's market among a number of subdivisions. For example, in the geographic dimension, a regional market may be allocated to various subregions. The markets can be sized in terms of product revenues, subscribers, or other units applicable to the product. System outputs occur in stages: outputs at one stage are sometimes used as inputs at a further stage. For example, in one embodiment, the database is populated with absolute market sizes, which are then drawn upon to supply responses to queries made by end users. However, such intermediate storage of market size data in the database is in no way essential to providing the market size data which is the primary output of the system.

Figure 1A:
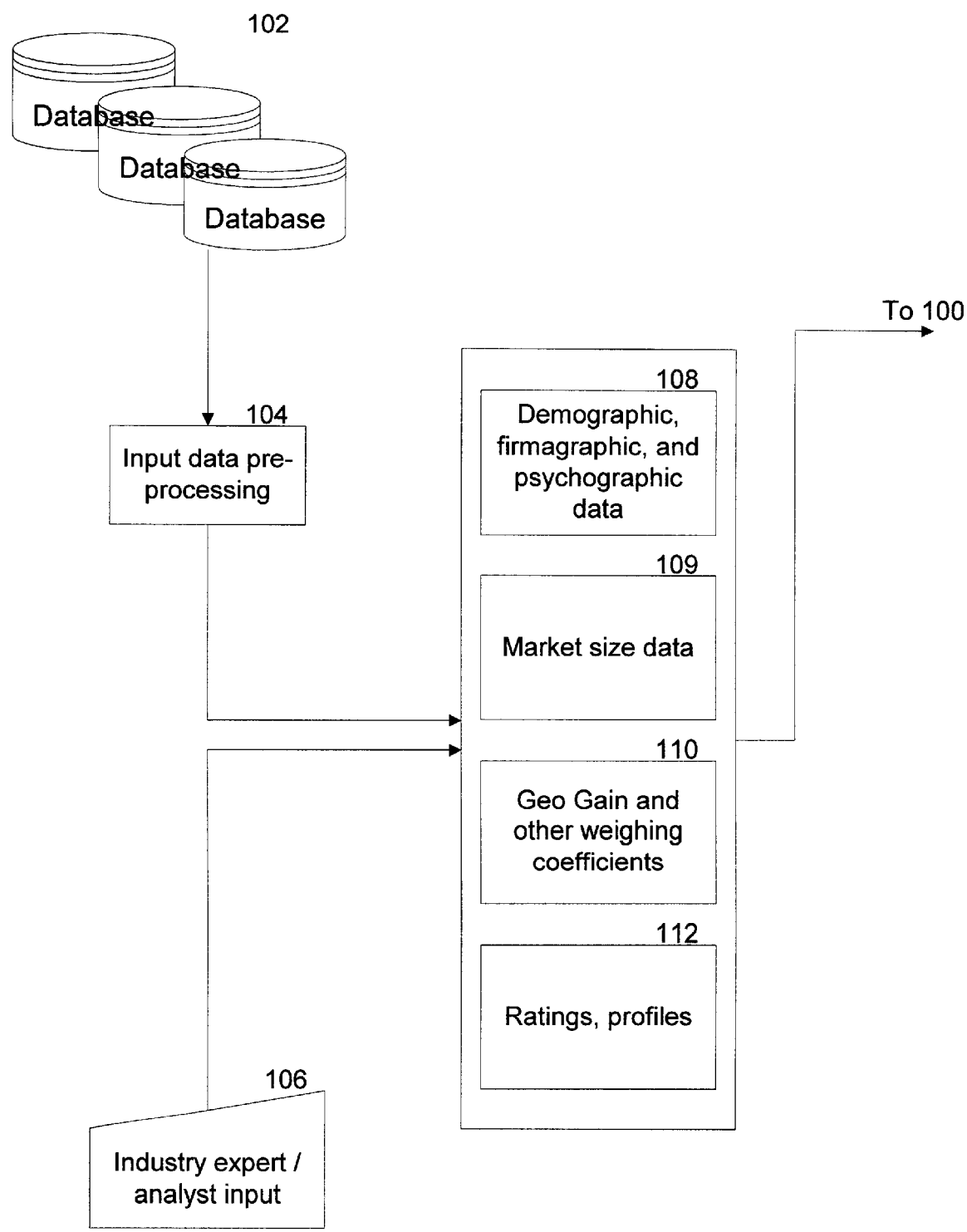
FIG. 1 is a block diagram overview of an apparatus, method, and system embodying features of the invention.
Figure 1B:
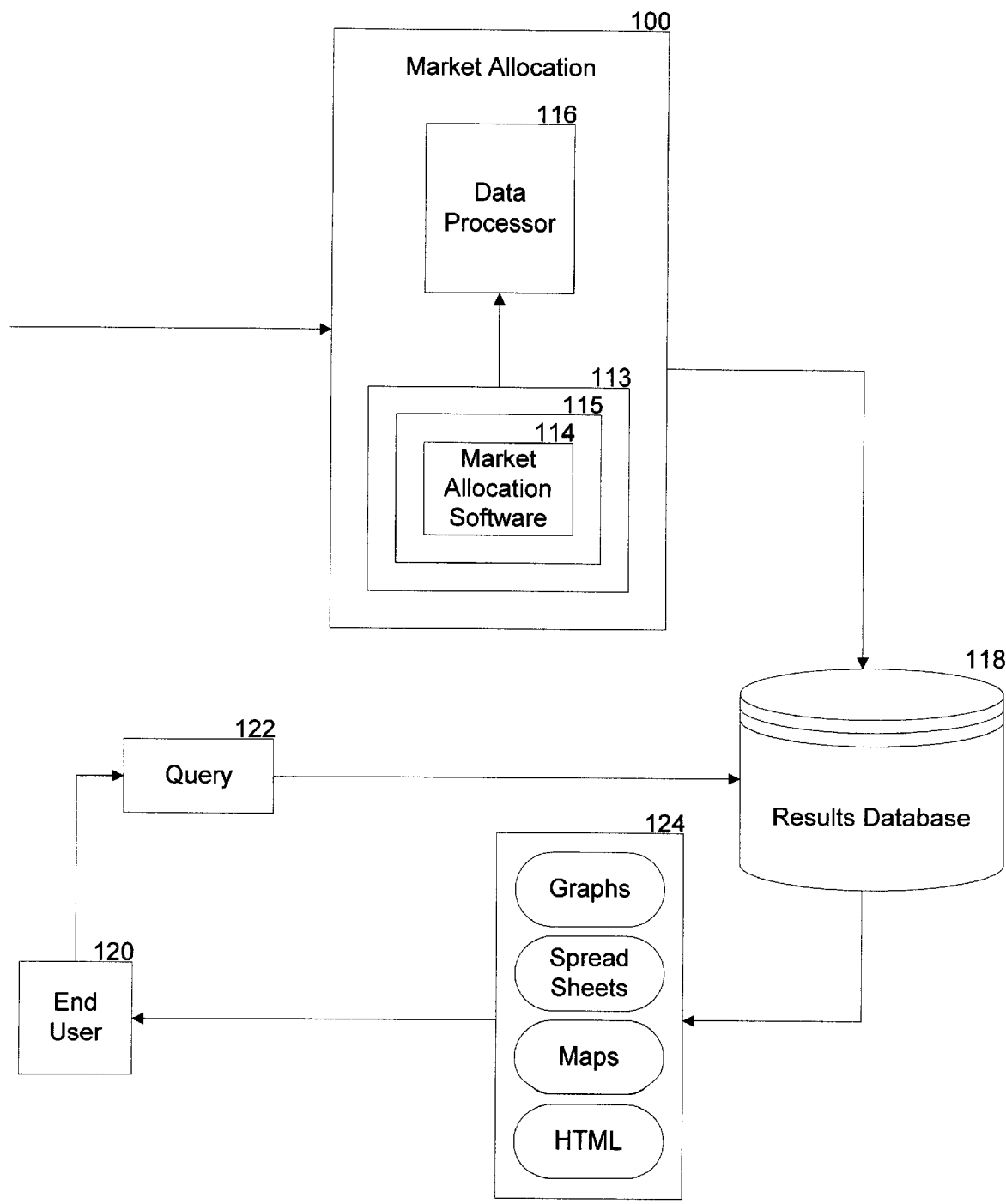

Referring to FIG. 1, external data 102 includes industry-specific regional (e.g., national) market data, and also demographic, psychographic, and/or firmagraphic data. This data generally requires some preprocessing, as shown in step 104. Input data 106 comes from industry experts knowledgeable in the particular market dynamics of the industry. From these inputs, data collections 108, 109, 110, and 112 are created. Data collection 108 contains demographic, psychographic, and/or firmagraphic data. Data collection 109 contains market size data (primarily high-level data for large geographic regions, since often that is all that is available). Data collection 110 contains weighting coefficients, and data collection 112 contains profiles and ratings.

In a market allocation module 100, the market size data 109 is allocated, using data collections 108, 110, and 112 in conjunction with market allocation software 114 and a data processor 116. The market allocation software 114 resides on a program storage device 113 having a computer-usable medium 115 for storing the program code. The program storage device 113 may be of a conventional variety, such as a conventional disk or memory device. The market allocation software 114 may be created using general-purpose application development tools such as programming languages, graphical design tools, and commercially available reusable software components. A general database engine may be used to manage data storage and retrieval. The processor 116 is part of a general-purpose computer system. Any general-purpose computer may be used, provided that the processing power is sufficient to achieve the desired speed of computation for the amount of data and number of dimensions being processed by the system.

A result database 118 contains market sizes by product, geographic area, market segment, provider, and time period.

An end user 120 can request specific information from the system through a query 122. The system accommodates post-processing of the output data, allowing delivery in various formats and through various electronic media. The system can generate output 124 in the form of graphs, spreadsheets, maps, HTML documents, or other formats. Because of the geographic nature of the output, it is ideally suited to a geographic presentation using mapping software. The output can be delivered electronically through a variety of channels, including facsimile, e-mail, and the worldwide web. It can also, of course, be provided in hard copy.

Result Database

Figure 2:
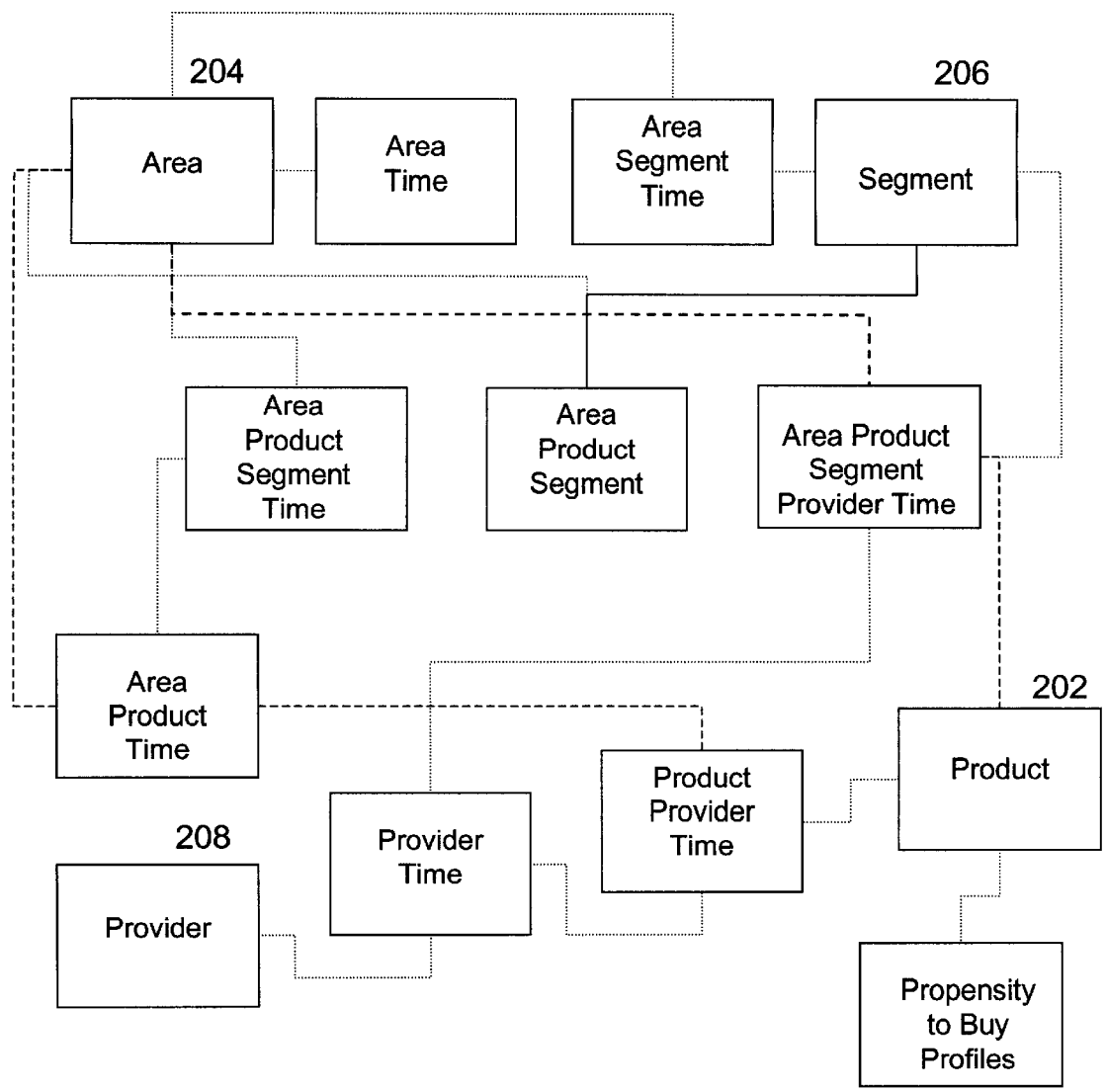
FIG. 2 is a high-level Entity Relationship Diagram (ERD) using IDEF1X notation, showing the structure of one embodiment of the result database of FIG. 1.

The structure of one embodiment of the result database 118 is shown in FIGS. 2 through 6. FIG. 2 is a high-level Entity Relationship Diagram (ERD), using IDEFIX notation. FIGS. 3 through 6 are ERDs showing further details of the database structure. (Other database structures could be used.) The following discussion refers to FIG. 2 as well as to FIGS. 3 through 6.

Figure 3:
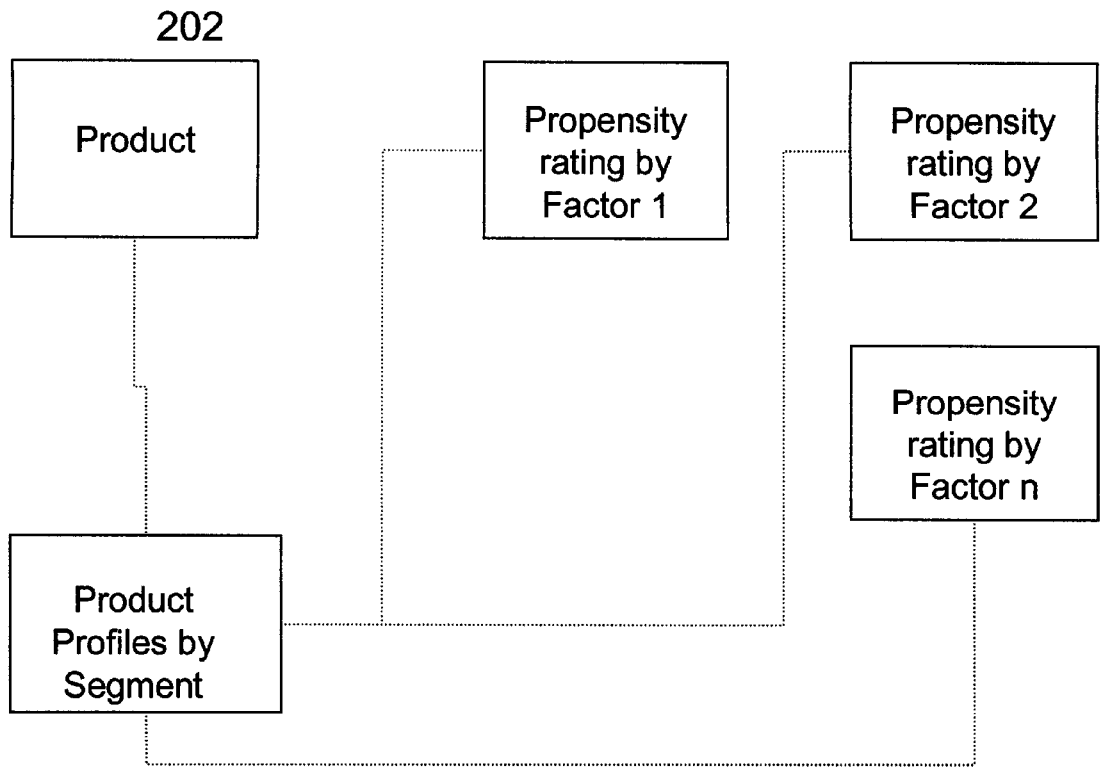
FIG. 3 is an ERD for product-related tables in one embodiment of the result database of FIG. 1.

Product entity 202 relates to the product dimension of the database. FIG. 3 is an ERD for one embodiment of product-related tables, showing more details for those tables. The term "product" is defined broadly and includes services. The system can determine market size by product for a particular geographic area, time period, etc. The total revenues for an industry may be obtained by summing the revenues for all of the industry's products.

Figure 4:
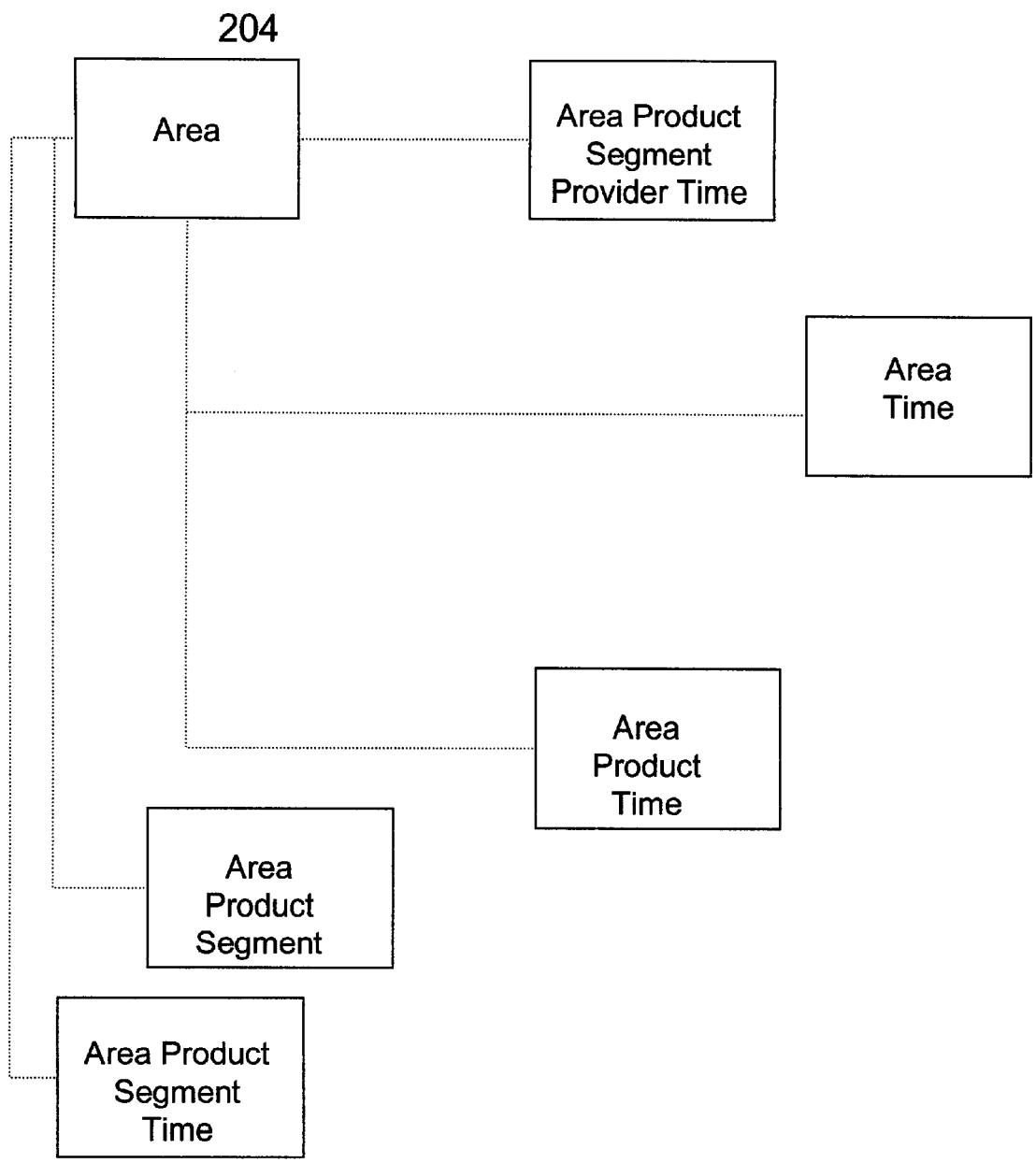
FIG. 4 is an ERD for geography-related tables in one embodiment of the result database of FIG. 1.

Area entity 204 of FIG. 2 relates to the geographic dimension of the database. FIG. 4 is an ERD for one embodiment of geography-related tables, showing more details for those tables. In the geographic dimension, the system allocates regional markets for an arbitrary number of levels of subregions. The term "region" is broadly defined and might be a nation such as Japan, or an area of a nation such as the Western U.S., or a continent such as Europe.

The system uses an area hierarchy to define the geographic areas for the particular industry being processed by the system. The area hierarchy describes the geographic parent-child database relationships, which are referred to here as region-subregion relationships. In other words, the terms "region" and "subregion" are relative. The subregions at one level of the area hierarchy become regions for purposes of the subregions at the next lower level of the area hierarchy. The area hierarchy is typically determined by the available demographic data. For example, one area hierarchy for the U.S. telecommunications market has the entire U.S. as the region and four levels of subregions, including Regional Bell Operating Company (RBOC) territories, states, Metropolitan Statistical Areas (MSAs), and counties.

New geographic areas can be created by combining subregions. For example, customized geographic areas such as those many companies and government entities use for administrative or other business purposes can be easily modeled. The system produces customized market data particular to the unique geographic areas defined. Post-processing can include the mapping of the geographic areas.

Market segment entity 206 of FIG. 2 relates to the market segment dimension of the database. In the market segment dimension, the system allocates product markets to specific market segments, e.g., residential customers or business customers. It is often useful to divide the market into market segments in order to analyze buying behavior and to target products to specific types of customers. Most available market analysis data is not segmented. The system can import external psychographic information defining market segments and the buying habits of each segment. The system can also accommodate the allocation of a market into segments by an industry analyst or other expert. Market segmentation can be very complex, dividing a given population into 50 or more market segments. Any market segmentation scheme could be used.

Figure 5:
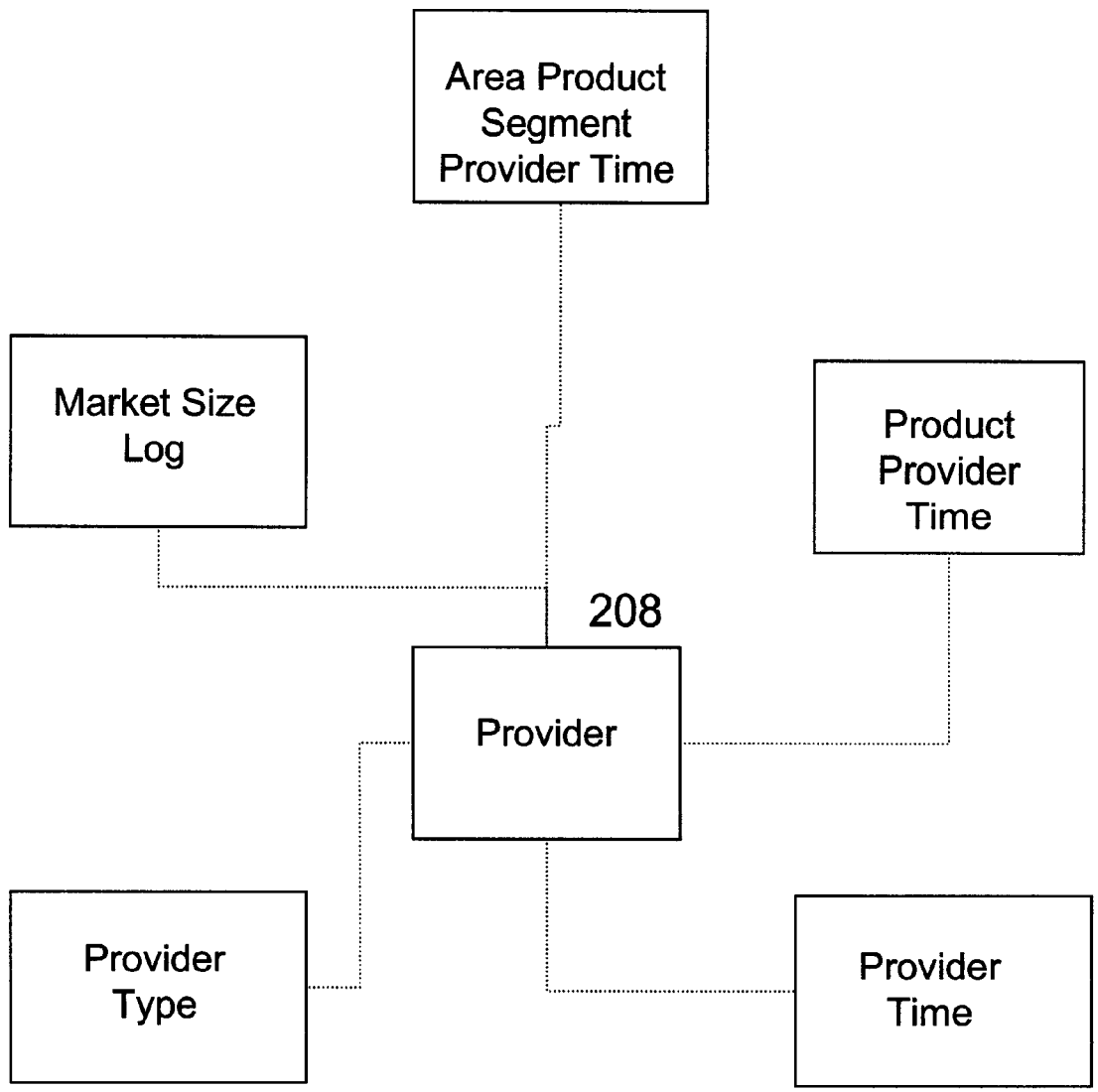
FIG. 5 is an ERD for provider-related tables in one embodiment of the result database of FIG. 1.

Provider entity 208 of FIG. 2 relates to the provider dimension of the database. FIG. 5 is an ERD for one embodiment of provider-related tables, showing more details for those tables. In the provider dimension, the market is sized according to the market share of a particular provider of the product. The companies that comprise a particular industry may operate in either a highly competitive environment or in a monopolistic environment for the provision of a particular product in a particular subregion, so there could be any number of providers for that product and subregion.

In the time dimension, the database can track both historic and forecasted market data. Any time frames can be accommodated. For example, in one embodiment, the database contains 20 quarters of historic market data and 20 quarters of current and/or forecasted market data. Since all market allocations performed by the system can be performed in each time period, the addition of more time periods can add significantly to the computing hardware requirements.

Forecasting can be done either by assigning a growth rate to each time period for a given product, by using product profiles, or by other means. Growth rates can also be made specific to geography and market segment. When product profiles are used, each product is assigned one of a series of profiles that generically describe a set of product growth trends, which often vary by the stages of a product life cycle. Product profiles can be displayed as line or bar charts of growth rates versus time. For example, one product profile might show a declining product that has reached the end of its life cycle and has increasingly smaller growth rates in each subsequent time period. An analyst or other user of the system can modify the profile for a particular product and geography.

Figure 6:
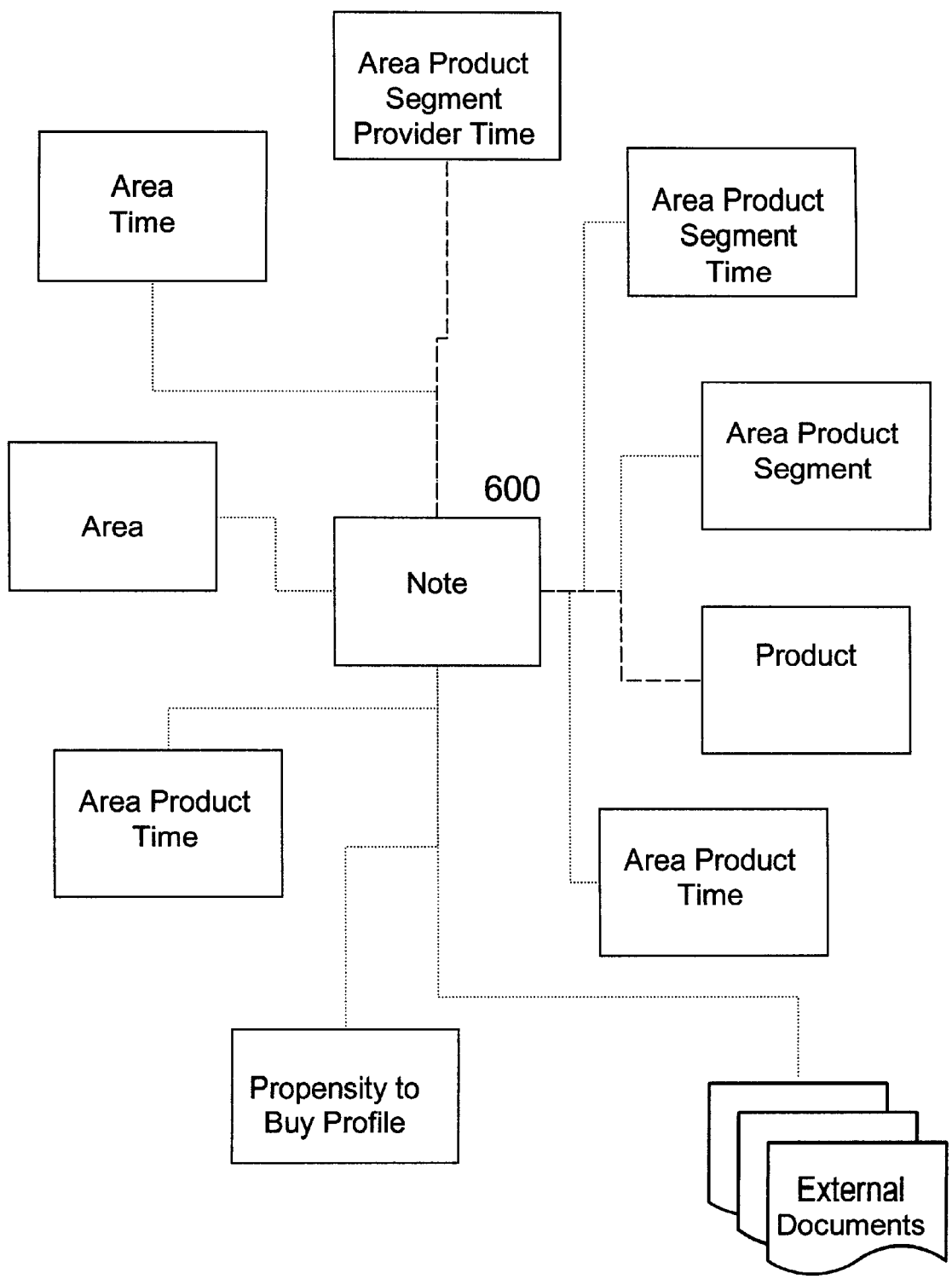
FIG. 6 is an ERD for note-related tables in one embodiment of the result database of FIG. 1.

In one embodiment, the system also contains extensive annotation facilities, permitting the creation, categorization, searching, filtering, and flexible reporting of notes covering virtually any data point stored in the result database. FIG. 6 is an ERD showing connections of the note entity to many other system entities as well as to external electronic and hard-copy documents. Individual notes can be linked to any number of separate database records. (This is useful, for example, in annotating a number of data points gleaned from a single source reference.) Links to external electronic documents such as spreadsheets, formatted word processor documents, and text files are supported by specific system facilities which allow such documents to be created and edited from within the market allocation software.

Allocation of Markets in the Geographic Dimension

The allocation of markets in the geographic dimension can be done before or after the allocation in other dimensions. The allocation is accomplished by computing an allocation fraction for each subregion at each level of the area hierarchy. Market factors such as age, household income, or occupation are used to compute the allocation fraction for each subregion.

As discussed above in relation to FIG. 1, data collections 108, 109, 110, and 112 are inputs to the market allocation process. Data collection 108 contains demographic, psychographic, and/or firmagraphic data. Data collection 109 contains market size data. Data collection 110 contains weighting coefficients, and data collection 112 contains profiles and ratings.

The demographic, psychographic, and/or firmagraphic data used in allocating the markets relates to a set of one or more selected market factors. For each market factor, there is a set of categories such as age brackets (e.g., 40–50 years of age), income brackets (e.g., $30,000–40,000 annual income), or occupations (e.g., machine operators). For each category, the data contains the subregional population falling within that category, e.g., the population that is 40–50 years old or the population that has $30,000–40,000 annual income. The term "population" is broadly defined here and might be persons, households, companies, or any other appropriate unit. Population units vary with the market factor being used.

For each category of each market factor, the profiles and ratings data includes a propensity-to-buy rating. For example, a propensity-to-buy rating would be assigned to the population that is 40–50 years old. This could be a value on a scale of 1 to 100 or any other scale.

The weighting coefficients are used to refine the market allocations and calibrate the system outputs to the real world. These inputs from an industry expert require specific knowledge of the five dimensions of the system (product, geography, market segment, provider, and time) for a given product. For example, the broadcast TV market has specific inputs related to geographic market penetration, service providers, seasonal adjustments in timeframes, and market segmentation such as urban residential customers.

Figure 7A:
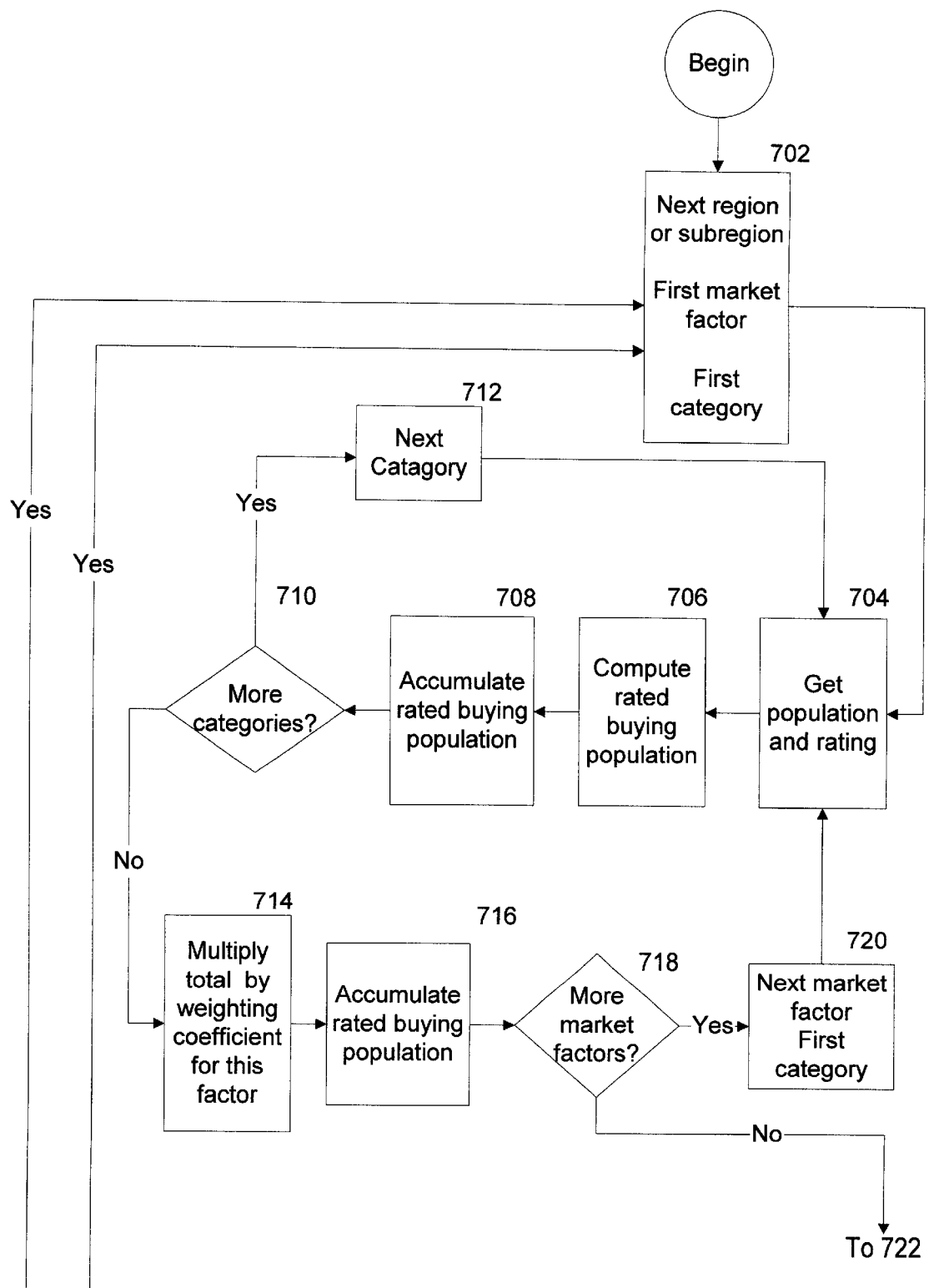
FIG. 7 is a flowchart showing one embodiment of determination of market allocation in the geographic dimension.
Figure 7B:
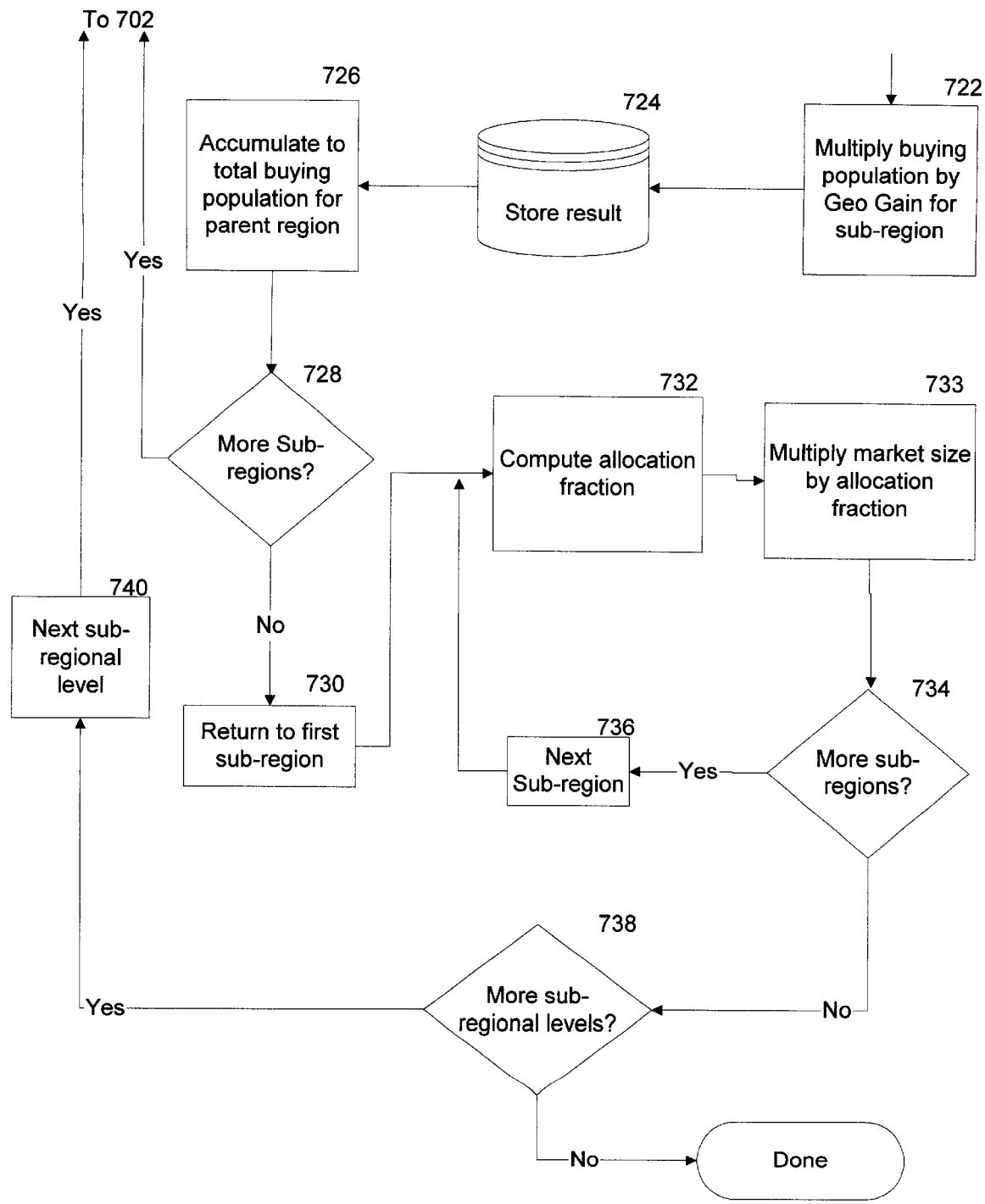

The market allocation for each subregion is determined as shown in FIG. 7. A rated buying population is computed for each region or subregion. In step 702, the region or subregion is selected together with the first market factor and the first category for the market factor.

In step 704, the subregion's population falling within the category (e.g., the number of persons between ages 40 and 50) and the propensity-to-buy rating for that category are obtained. In step 706, the rated buying population for the category is computed by multiplying the propensity-to-buy rating by the population falling within the category. In step 708, the rated buying population for the category is accumulated into the rated buying population for the market factor (the rated buying population for the market factor is the sum of the rated buying populations for all of the categories for that market factor). Steps 710 and 712 cause this procedure to be repeated for each remaining category in the set of categories for that market factor, resulting in the total rated buying population for that market factor.

In step 714, a weighting coefficient is obtained for the market factor, and the total rated buying population for the market factor is multiplied by the weighting coefficient, resulting in a weighted rated buying population for that market factor. In step 716, the weighted rated buying population for the market factor is accumulated into the rated buying population for the region or subregion (the rated buying population for the region or subregion is the sum of the weighted rated buying populations for all of the market factors in the set of selected market factors). Steps 718 and 720 cause this procedure to be repeated for each remaining market factor in the set of market factors, resulting in the total rated buying population for that region or subregion.

In step 722, the unweighted rated buying population for the subregion is multiplied by a Geo Gain weighting coefficient for the subregion, resulting in a weighted rated buying population for the subregion. In step 724, the weighted rated buying population for the subregion is stored. In step 726, the weighted rated buying population for the subregion is accumulated into the weighted rated buying population for the current region (the weighted rated buying population for the current region is the sum of the weighted rated buying populations for all of the subregions in that region). Steps 728 and 702 cause this procedure to be repeated for each remaining subregion in the current region, resulting in the total weighted rated buying population for the current region.

Step 730 returns to the first subregion in the current region, i.e., at the current level of the area hierarchy. In step 732, the allocation fraction for the subregion is computed by dividing the weighted rated buying population for the subregion by the total weighted rated buying population for all of the subregions at this level (which is the weighted rated buying population for the current region). In Step 733, the market size for the current region is multiplied by the allocation fraction, resulting in a market size for the subregion. (At the highest level of the area hierarchy, the market size for the current region is an input, and at lower levels of the hierarchy, it may be obtained from the market allocation process at the next higher level.) Steps 734 and 736 cause this procedure to be repeated for each remaining subregion in the current region, i.e., for each remaining subregion at this level. Steps 738 and 740 cause this procedure to be repeated for each remaining level of the area hierarchy.

Alternatively, the market sizes of the subregions could be determined after all of the allocation fractions have been computed at all levels of the area hierarchy. Each allocation fraction is multiplied by the appropriate market size for a particular product and time period.

Integration of External Subregional Market Size Values with Allocated Values

Known external subregional market size values can be substituted for allocated values. In this case, the system adjusts all related computed values so that the sum of the subregional allocations still equals the accepted value for the parent region. (The accepted value for the parent region might also be either an allocated value or an externally obtained value.) Supporting this option to permit the incorporation of external market size data at the subregional level greatly increases the number of computations needed to process the data, making a higher-powered computer preferable.

Figure 8A:
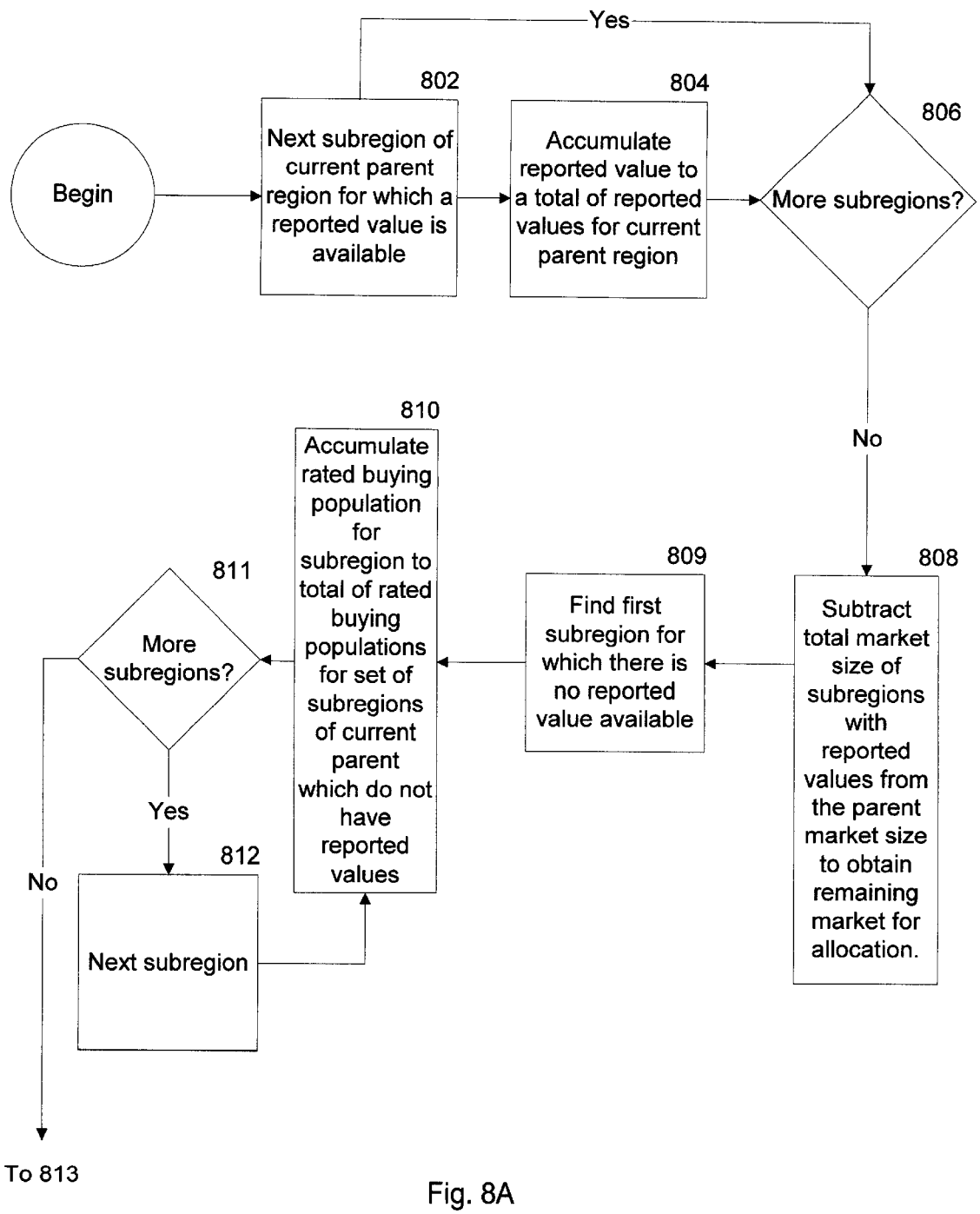
FIG. 8 is a flowchart showing one embodiment of integration of external subregional market size values with allocated values.
Figure 8B:
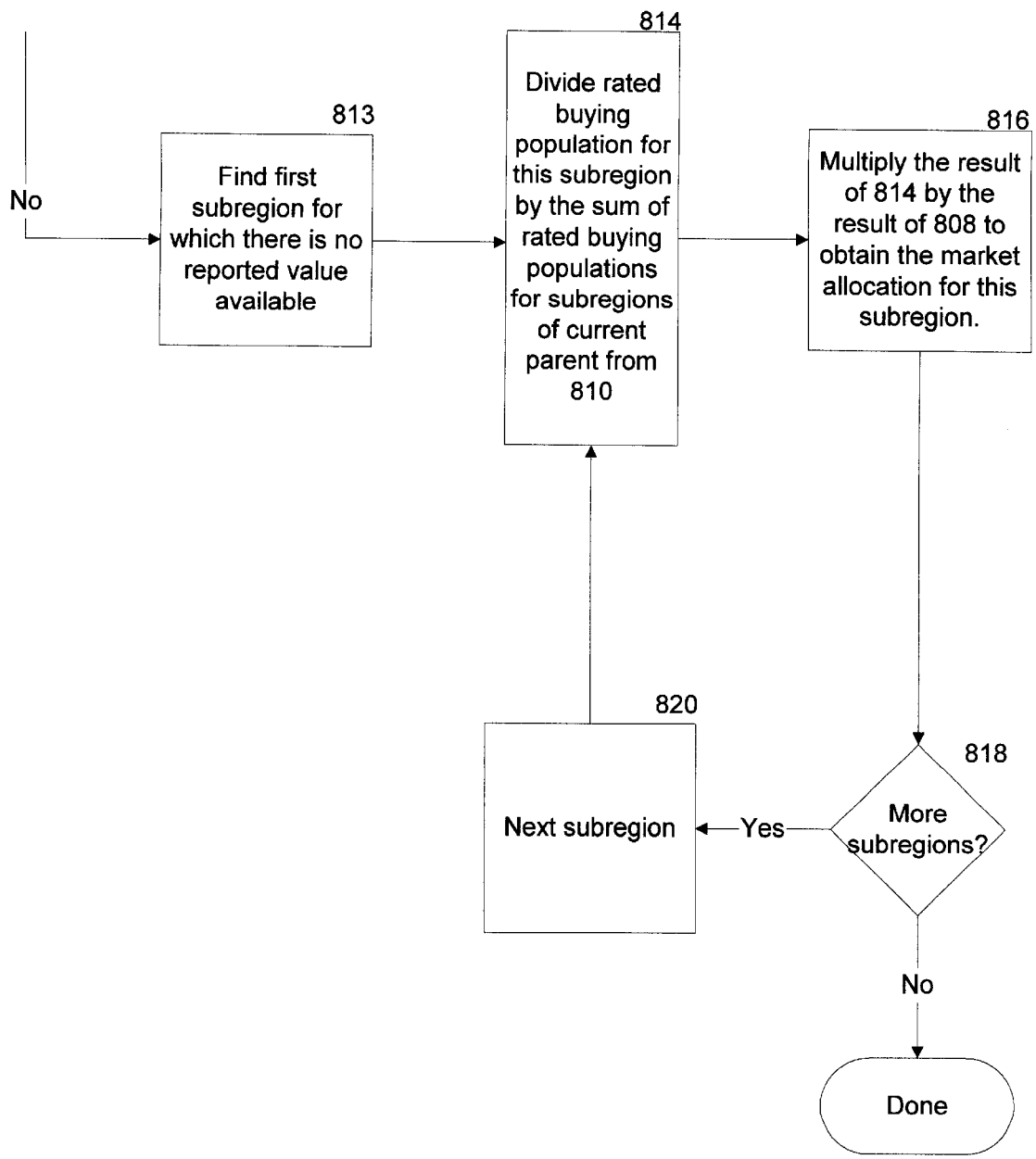

FIG. 8 shows one embodiment of the incorporation of subregional market size data for a particular level of the area hierarchy. Steps 802, 804, and 806 sum the subregional reported market size values for a particular level of the area hierarchy. In step 808, the total of the reported values is subtracted from the market size for the current region (i.e., the parent level) to obtain the remaining market size for allocation. Steps 809, 810, 811, and 812 sum the rated buying populations for all subregions at the current level that do not have a reported value.

Step 813 then returns to the first subregion at the current level for which no reported value is available. In step 814, the rated buying population for this subregion is divided by the sum of the rated buying populations for subregions with no reported values at the current level (the result of step 810). In step 816, the result of the previous operation (step 814) is multiplied by the remaining market size for allocation, i.e., the result of step 808, to obtain the market allocation for this subregion. Steps 818 and 820 cause this procedure to be repeated for each remaining subregion with no reported value at the current level.

The same result could also be achieved by using allocation fractions instead of rated buying populations in the computations of FIG. 8.

CONCLUSIONS, RAMIFICATIONS, AND SCOPE

Accordingly, it can be seen that this invention satisfies the need to produce consistent, reliable, refinable localized market data. Although the description above contains many specificities, these should not be construed as limiting the scope of the invention but as merely providing illustrations of some of the presently preferred embodiments of this invention. Various other embodiments and ramifications are possible within its scope. Thus the scope of the invention should be determined by the appended claims and their legal equivalents, rather than by the examples given.

We claim:

1. A method of using a computer for sizing a market in a subregion of a region to aid in marketing products or services, said method comprising the steps of:

storing in said computer a market size for said region;

determining a rated buying population for said subregion, based on actual preferences for products or services;

determining a rated buying population for said region, based on actual preferences for products or services;

dividing said rated buying population for said subregion by said rated buying population for said region, thereby generating a market allocation fraction;

multiplying said market allocation fraction by said market size for said region, thereby generating a market size for said subregion; and outputting said market size for said subregion, which aids in marketing products or services.

2. The method of claim 1 wherein said step of determining a rated buying population for said subregion comprises:

determining a rated buying population for each market factor in a set of one or more market factors; and summing all of said rated buying populations for said set of market factors, thereby generating a rated buying population for said subregion.

3. The method of claim 2 wherein said step of determining a rated buying population for each market factor comprises performing the following steps for each market factor:

determining a rated buying population for each category in a set of categories for said market factor; and summing all of said rated buying populations for said set of categories for said market factor, thereby generating a rated buying population for said market factor.

4. The method of claim 3 wherein said step of determining a rated buying population for each category comprises performing the following steps for each category:

storing in said computer a population for said category;

storing in said computer a propensity-to-buy rating for said category; and multiplying said population for said category by said propensity-to-buy rating for said category, thereby generating a rated buying population for said category.

5. The method of claim 4 wherein said step of determining a rated buying population for each market factor further comprises performing the following step for each market factor:

weighting said rated buying population for said market factor by multiplying by a weighting coefficient for said market factor.

6. The method of claim 5 wherein said step of determining a rated buying population for said subregion further comprises:

weighting said rated buying population for said subregion by multiplying by a weighting coefficient for said subregion.

7. The method of claim 6 wherein said step of determining a rated buying population for said region comprises:

determining a rated buying population for each subregion in a set of mutually exclusive subregions that together include all of said region; and summing all of said rated buying populations for said set of mutually exclusive subregions, thereby generating a rated buying population for said region.

8. A method of using a computer for creating a database of market size data for a set of one or more subregions of a region to aid in marketing products or services, said method comprising the steps of:

storing in said compuer a market size for said region;

determining a rated buying population for each subregion in said set of subregions, based on actual preferences for products or services;

determining a rated buying population for said region, based on actual preferences for products or services;

dividing said rated buying population for each subregion in said set of subregions by said rated buying population for said region, thereby generating a set of market allocation fractions;

multiplying each market allocation fraction in said set of market allocation fractions by said market size for said region, thereby generating a set of maret sizes for said set of subregions;

accesibly storing in said computer said set of market sizes for said set of subregions; and outputting any market size in said set of market sizes for said set of subregions, which aids in marketing products or services.

9. The method of claim 8 wherein said step of determining a rated buying population for each subregion comprises performing the following steps for each subregion:

determining a rated buying population for each market factor in a set of one or more market factors; and summing all of said rated buying populations for said set of market factors, thereby generating a rated buying population for said subregion.

10. The method of claim 9 wherein said step of determining a rated buying population for each market factor comprises performing the following steps for each market factor:

determining a rated buying population for each category in a set of categories for said market factor; and summing all of said rated buying populations for said set of categories for said market factor, thereby generating a rated buying population for said market factor.

11. The method of claim 10 wherein said step of determining a rated buying population for each category comprises performing the following steps for each category:

storing in said computer a population for said category;

storing in said computer a propensity-to-buy rating for said category; and multiplying said population for said category by said propensity-to-buy rating for said category, thereby generating a rated buying population for said category.

12. The method of claim 11 wherein said step of determining a rated buying population for each market factor further comprises performing the following step for each market factor:

weighting said rated buying population for said market factor by multiplying by a weighting coefficient for said market factor.

13. The method of claim 12 wherein said step of determining a rated buying population for each subregion further comprises performing the following step for each subregion:

weighting said rated buying population for said subregion by multiplying by a weighting coefficient for said subregion.

14. The method of claim 13 wherein said step of determining a rated buying population for said region comprises:

determining a rated buying population for each subregion in a set of mutually exclusive subregions that together include all of said region; and summing all of said rated buying populations for said set of mutually exclusive subregions.

15. An apparatus for sizing a market in a subregion of a region to aid in marketing products or services, said apparatus comprising:

means for storing a market size for said region;

means for determining a rated buying population for said subregion, based on actual preferences for products or services;

means for determining a rated buying population for said region, based on actual preferences for products or services;

means for dividing said rated buying population for said subregion by said rated buying population for said region, thereby generating a market allocation fraction;

means for multiplying said market allocation fraction by said market size for said region, thereby generating a market size for said subregion; and means for outputting said market size for said subregion, which aids in marketing products or services.

means for storing a market size for said region;

means for determining a rated buying population for said subregion;

means for determining a rated buying population for said region;

means for dividing said rated buying population for said subregion by said rated buying population for said region, thereby generating a market allocation fraction; and means for multiplying said market allocation fraction by said market size for said region, thereby generating a market size for said subregion.

16. The apparatus of claim 15 wherein said means for determining a rated buying population for said subregion comprises:

means for determining a rated buying population for each market factor in a set of one or more market factors; and means for summing all of said rated buying populations for said set of market factors, thereby generating a rated buying population for said subregion.

17. The apparatus of claim 16 wherein said means for determining a rated buying population for each market factor comprises:

means for determining a rated buying population for each category in a set of categories for said market factor; and means for summing all of said rated buying populations for said set of categories for said market factor, thereby generating a rated buying population for said market factor.

18. The apparatus of claim 17 wherein said means for determining a rated buying population for each category comprises:

means for storing a population for said category;

means for storing a propensity-to-buy rating for said category; and means for multiplying said population for said category by said propensity-to-buy rating for said category, thereby generating a rated buying population for said category.

19. The apparatus of claim 18 wherein said means for determining a rated buying population for each market factor further comprises:
means for weighting said rated buying population for said market factor by multiplying by a weighting coefficient for said market factor.

20. The apparatus of claim 19 wherein said means for determining a rated buying population for said subregion further comprises:
means for weighting said rated buying population for said subregion by multiplying by a weighting coefficient for said subregion.

21. The apparatus of claim 20 wherein said means for determining a rated buying population for said region comprises:
means for determining a rated buying population for each subregion in a set of mutually exclusive subregions that together include all of said region; and
means for summing all of said rated buying populations for said set of mutually exclusive subregions, thereby generating a rated buying population for said region.

22. An apparatus for creating a database of market size data for a set of one or more subregions of a region to aid in marketing products or services, said apparatus comprising:
means for storing a market size for said region;
means for determining a rated buying population for each subregion in said set of subregions, based on actual preferences for products or services;
means for determining a rated buying population for said region, based on actual preferences for products or services;
means for dividing said rated buying population for each subregion in said set of subregions by said rated buying population for said region, thereby generating a set of market allocation fractions;
means for multiplying each maret allocation fraction in said set of market allocation fractions by said market size for said region, thereby generating a set of market sizes for said set of subregions;
means for accessibly storing said set of market sizes for said set of subregions; and
means for ouputting any market size in said set of market sizes for said set of subregions, which aids in marketing products or services.

23. The apparatus of claim 22 wherein said means for determining a rated buying population for each subregion comprises:
means for determining a rated buying population for each market factor in a set of one or more market factors; and
means for summing all of said rated buying populations for said set of market factors, thereby generating a rated buying population for said subregion.

24. The apparatus of claim 23 wherein said means for determining a rated buying population for each market factor comprises:
means for determining a rated buying population for each category in a set of categories for said market factor; and
means for summing all of said rated buying populations for said set of categories for said market factor, thereby generating a rated buying population for said market factor.

25. The apparatus of claim 24 wherein said means for determining a rated buying population for each category comprises:
means for storing a population for said category;
means for storing a propensity-to-buy rating for said category; and
means for multiplying said population for said category by said propensity-to-buy rating for said category, thereby generating a rated buying population for said category.

26. The apparatus of claim 25 wherein said means for determining a rated buying population for each market factor further comprises:
means for weighting said rated buying population for said market factor by multiplying by a weighting coefficient for said market factor.

27. The apparatus of claim 26 wherein said means for determining a rated buying population for each subregion further comprises:
means for weighting said rated buying population for said subregion by multiplying by a weighting coefficient for said subregion.

28. The apparatus of claim 27 wherein said means for determining a rated buying population for said region comprises:
means for determining a rated buying population for each subregion in a set of mutually exclusive subregions that together include all of said region; and
means for summing all of said rated buying populations for said set of mutually exclusive subregions.

29. A program storage device readable by a machine, tangibly embodying a program of instructions executable by the machine to perform method steps for sizing a market in a subregion of a region to aid in marketing products or services, said method steps comprising:
storing a market size for said region;
determining a rated buying population for said subregion, based on actual preferences for products or services;
determining a rated buying population for said region, based on actual preferences for products or services;
dividing said rated buying population for said subregion by said rated buying population for said region, thereby generating a market allocation fraction;
multiplying said market allocation fraction by said market size for said region, thereby generating a market size for said subregion; and
outputting said market size for said subregion, which aids in marketing products or services.

30. The program storage device of claim 29 wherein said step of determining a rated buying population for said subregion comprises:
determining a rated buying population for each market factor in a set of one or more market factors; and
summing all of said rated buying populations for said set of market factors, thereby generating a rated buying population for said subregion.

31. The program storage device of claim 30 wherein said step of determining a rated buying population for each market factor comprises performing the following steps for each market factor:
determining a rated buying population for each category in a set of categories for said market factor; and
summing all of said rated buying populations for said set of categories for said market factor, thereby generating a rated buying population for said market factor.

32. The program storage device of claim 31 wherein said step of determining a rated buying population for each category comprises performing the following steps for each category:

storing a population for said category;

storing a propensity-to-buy rating for said category; and multiplying said population for said category by said propensity-to-buy rating for said category, thereby generating a rated buying population for said category.

33. The program storage device of claim 32 wherein said step of determining a rated buying population for each market factor further comprises performing the following step for each market factor:

weighting said rated buying population for said market factor by multiplying by a weighting coefficient for said market factor.

34. The program storage device of claim 33 wherein said step of determining a rated buying population for said subregion further comprises:

weighting said rated buying population for said subregion by multiplying by a weighting coefficient for said subregion.

35. The program storage device of claim 34 wherein said step of determining a rated buying population for said region comprises:

determining a rated buying population for each subregion in a set of mutually exclusive subregions that together include all of said region; and summing all of said rated buying populations for said set of mutually exclusive subregions, thereby generating a rated buying population for said region.

36. A program storage device readable by a machine, tangibly embodying a program of instructions executable by the machine to perform method steps for creating a database of market size data for a set of one or more subregions of a region to aid in marketing products or services, said method steps comprising:

storing a market size for said region;

determining a rated buying population for each subregion in said set of subregions, based on actual preferences for products or services;

determining a rated buying population for said region, based on actual preferences for products or services;

dividing said rated buying population for each subregion in said set of subregions by said rated buying population for said region, thereby generating a set of market allocation fractions;

multiplying each market allocation fraction in said set of market allocation fractions by said market size for said region, thereby generating a set of market sizes for said set of subregions;

accessibly storing said set of market sizes for said set of subregions; and outputting any market size in said set of market sizes for said set of subregions, which aids in marketing products or services.

37. The program storage device of claim 36 wherein said step of determining a rated buying population for each subregion comprises performing the following steps for each subregion:

determining a rated buying population for each market factor in a set of one or more market factors; and summing all of said rated buying populations for said set of market factors, thereby generating a rated buying population for said subregion.

38. The program storage device of claim 37 wherein said step of determining a rated buying population for each market factor comprises performing the following steps for each market factor:

determining a rated buying population for each category in a set of categories for said market factor; and summing all of said rated buying populations for said set of categories for said market factor, thereby generating a rated buying population for said market factor.

39. The program storage device of claim 38 wherein said step of determining a rated buying population for each category comprises performing the following steps for each category:

storing a population for said category;

storing a propensity-to-buy rating for said category; and multiplying said population for said category by said propensity-to-buy rating for said category, thereby generating a rated buying population for said category.

40. The program storage device of claim 39 wherein said step of determining a rated buying population for each market factor further comprises performing the following step for each market factor:

weighting said rated buying population for said market factor by multiplying by a weighting coefficient for said market factor.

41. The program storage device of claim 40 wherein said step of determining a rated buying population for each subregion further comprises performing the following step for each subregion:

weighting said rated buying population for said subregion by multiplying by a weighting coefficient for said subregion.

42. The program storage device of claim 41 wherein said step of determining a rated buying population for said region comprises:

determining a rated buying population for each subregion in a set of mutually exclusive subregions that together include all of said region; and summing all of said rated buying populations for said set of mutually exclusive subregions.

43. An article of manufacture comprising a computer-usable medium having computer-readable program code means embodied in said medium for sizing a market in a subregion of a region to aid in marketing products or services, said computer-readable program code means comprising:

program code means for storing a market size for said region;

program code means for determining a rated buying population for said subregion, based on actual preferences for products or services;

program code means for determining a rated buying population for said region, based on actual preferences for products or services;

program code means for dividing said rated buying population for said subregion by said rated buying population for said region, thereby generating a market allocation fraction;

program code means for multiplying said market allocation fraction by said market size for said region, thereby generating a market size for said subregion; and program code means for outputting said market size for said subregion, which aids in marketing products or services.

program code means for dividing said rated buying population for said subregion by said rated buying population for said region, thereby generating a market allocation fraction; and program code means for multiplying said market allocation fraction by said market size for said region, thereby generating a market size for said subregion.

44. The article of manufacture of claim 43 wherein said program code means for determining a rated buying population for said subregion comprises:

program code means for determining a rated buying population for each market factor in a set of one or more market factors; and program code means for summing all of said rated buying populations for said set of market factors, thereby generating a rated buying population for said subregion.

45. The article of manufacture of claim 44 wherein said program code means for determining a rated buying population for each market factor comprises:

program code means for determining a rated buying population for each category in a set of categories for said market factor; and program code means for summing all of said rated buying populations for said set of categories for said market factor, thereby generating a rated buying population for said market factor.

46. The article of manufacture of claim 45 wherein said program code means for determining a rated buying population for each category comprises:

program code means for storing a population for said category;

program code means for storing a propensity-to-buy rating for said category; and program code means for multiplying said population for said category by said propensity-to-buy rating for said category, thereby generating a rated buying population for said category.

47. The article of manufacture of claim 46 wherein said program code means for determining a rated buying population for each market factor further comprises:

program code means for weighting said rated buying population for said market factor by multiplying by a weighting coefficient for said market factor.

48. The article of manufacture of claim 47 wherein said program code means for determining a rated buying population for said subregion further comprises:

program code means for weighting said rated buying population for said subregion by multiplying by a weighting coefficient for said subregion.

49. The article of manufacture of claim 48 wherein said program code means for determining a rated buying population for said region comprises:

program code means for determining a rated buying population for each subregion in a set of mutually exclusive subregions that together include all of said region; and program code means for summing all of said rated buying populations for said set of mutually exclusive subregions, thereby generating a rated buying population for said region.

50. An article of manufacture comprising a computer-usable medium having computer-readable program code means embodiment in said medium for creating a database of market size data for a set of one or more subregion of a region to aid in marketing products or services, said computer-readable program code means comprising:

program code means for storing a market size for said region;

program code means for determining a rated buying population for each subregion in said set of subregions, based on actual preferences for products or services;

program code means for determining a rated buying population for said region, based on actual preferences for products or services;

program code means for dividing said rated buying population for each subregion in said set of subregions by said rated buying population for said region, thereby generating a set of market allocation fractions;

program code means for multiplying each market allocation fraction in said set of market allocation fractions by said market size for said region, thereby generating a set of market sizes for said set of subregions;

program code means for accessibly storing said set of market sizes for said set of subregions; and program code means for outputting any market size in said set of market sizes for said set of subregions, which aids in marketing products or services.

51. The article of manufacture of claim 50 wherein said program code means for determining a rated buying population for each subregion comprises:

program code means for determining a rated buying population for each market factor in a set of one or more market factors; and program code means for summing all of said rated buying populations for said set of market factors, thereby generating a rated buying population for said subregion.

52. The article of manufacture of claim 51 wherein said program code means for determining a rated buying population for each market factor comprises:

program code means for determining a rated buying population for each category in a set of categories for said market factor; and program code means for summing all of said rated buying populations for said set of categories for said market factor, thereby generating a rated buying population for said market factor.

53. The article of manufacture of claim 52 wherein said program code means for determining a rated buying population for each category comprises:

program code means for storing a population for said category;

program code means for storing a propensity-to-buy rating for said category; and program code means for multiplying said population for said category by said propensity-to-buy rating for said category, thereby generating a rated buying population for said category.

54. The article of manufacture of claim 53 wherein said program code means for determining a rated buying population for each market factor further comprises:

program code means for weighting said rated buying population for said market factor by multiplying by a weighting coefficient for said market factor.

55. The article of manufacture of claim 54 wherein said program code means for determining a rated buying population for each subregion further comprises:

program code means for weighting said rated buying population for said subregion by multiplying by a weighting coefficient for said subregion.

56. The article of manufacture of claim 55 wherein said program code means for determining a rated buying population for said region comprises:

program code means for determining a rated buying population for each subregion in a set of mutually exclusive subregions that together include all of said region; and program code means for summing all of said rated buying populations for said set of mutually exclusive subregions.

57. A method of using a computer for sizing a market in a selected subregion of a region to aid in marketing products or services, said method comprising the steps of:

storing in said computer a market size for said region and a market size for each subregion in a set of one or more subregions of said region, wherein said selected subregion is not included in said set of subregions;

summing all of said market sizes for said set of subregions, thereby generating a total reported market size for said set of subregions;

subtracting said total reported market size for said set of subregions from said market size for said region, thereby generating a remaining market size for allocation;

determining a rated buying population for said selected subregion, based on actual preferences for products or services;

determining a rated buying population for the portion of said region not included in said set of subregions, based on actual preferences for products or services;

dividing said rated buying population for said selected subregion by said rated buying population for said portion of said region not included in said set of subregions, thereby generating a market allocation fraction;

multiplying said market allocation fraction by said remaining market size for allocation, thereby generating a market size for said selected subregion; and outputting said market size for said selected subregion, which aids in marketing products or services.

58. The method of claim 57 wherein said step of determining a rated buying population for said selected subregion comprises:

determining a rated buying population for each market factor in a set of one or more market factors; and summing all of said rated buying populations for said set of market factors, thereby generating a rated buying population for said selected subregion.

59. The method of claim 58 wherein said step of determining a rated buying population for each market factor comprises performing the following steps for each market factor:

determining a rated buying population for each category in a set of categories for said market factor; and summing all of said rated buying populations for said set of categories for said market factor, thereby generating a rated buying population for said market factor.

60. The method of claim 59 wherein said step of determining a rated buying population for each category comprises performing the following steps for each category:

storing in said computer a population for said category;

storing in said computer a propensity-to-buy rating for said category; and multiplying said population for said category by said propensity-to-buy rating for said category, thereby generating a rated buying population for said category.

61. The method of claim 60 wherein said step of determining a rated buying population for each market factor further comprises performing the following step for each market factor:

weighting said rated buying population for said market factor by multiplying by a weighting coefficient for said market factor.

62. The method of claim 61 wherein said step of determining a rated buying population for said selected subregion further comprises:

weighting said rated buying population for said selected subregion by multiplying by a weighting coefficient for said selected subregion.

63. The method of claim 62 wherein said step of determining a rated buying population for the portion of said region not included in said set of subregions comprises:

determining a rated buying population for each subregion in said region not included in said set of subregions; and summing all of said rated buying populations for said subregions in said region not included in said set of subregions, thereby generating a rated buying population for the portion of said region not included in said set of subregions.

64. A method of using a computer for creating a database of market size data for a first set of one or more subregions of a region to aid in marketing products or services, said method comprising the steps of:

storing in said computer a market size for said region and a market size for each subregion in a second set of one or more subregions of said region, wherein said first set of subregions and said second set of subregions are mutually exclusive;

summing all of said market sizes for said second set of subregions, thereby generating a total reported market size for said second set of subregions;

subtracting said total reported market size for said second set of subregions from said market size for said region, thereby generating a remaining market size for allocation;

determining a rated buying population for each subregion in said first set of subregions, based on actual preferences for products or services;

determining a rated buying population for the portion of said region not included in said second set of subregions, based on actual preferences for products or services;

dividing said rated buying population for each subregion in said first set of subregions by said rated buying population for said portion of said region not included in said second set of subregions, thereby generating a set of market allocation fractions;

multiplying each market allocation fraction in said set of market allocation fractions by said remaining market size for allocation, thereby generating a set of market sizes for said first set of subregions;

accessibly storing in said computer said set of market sizes for said first set of subregions; and outputting any market size in said set of market sizes for said first set of subregions, which aids in marketing products or services.

65. The method of claim 64 wherein said step of determining a rated buying population for each subregion in said first set of subregions comprises performing the following steps for each subregion in said first set of subregions:

determining a rated buying population for each market factor in a set of one or more market factors; and summing all of said rated buying populations for said set of market factors, thereby generating a rated buying population for said subregion.

66. The method of claim 65 wherein said step of determining a rated buying population for each market factor comprises performing the following steps for each market factor:

determining a rated buying population for each category in a set of categories for said market factor; and summing all of said rated buying populations for said set of categories for said market factor, thereby generating a rated buying population for said market factor.

67. The method of claim 66 wherein said step of determining a rated buying population for each category comprises performing the following steps for each category:

storing in said computer a population for said category;

storing in said computer a propensity-to-buy rating for said category; and multiplying said population for said category by said propensity-to-buy rating for said category, thereby generating a rated buying population for said category.

68. The method of claim 67 wherein said step of determining a rated buying population for each market factor further comprises performing the following step for each market factor:

weighting said rated buying population for said market factor by multiplying by a weighting coefficient for said market factor.

69. The method of claim 68 wherein said step of determining a rated buying population for each subregion in said first set of subregions further comprises performing the following step for each subregion in said first set of subregions:

weighting said rated buying population for said subregion by multiplying by a weighting coefficient for said subregion.

70. The method of claim 69 wherein said step of determining a rated buying population for the portion of said region not included in said second set of subregions comprises:

determining a rated buying population for each subregion in said region not included in said second set of subregions; and summing all of said rated buying populations for said subregions in said region not included in said second set of subregions, thereby generating a rated buying population for the portion of said region not included in said second set of subregions.

71. An apparatus for sizing a market in a selected subregion of a region in marketing products or services, said apparatus comprising:

means for storing a market size for said region and a market size for each subregion in a set of one or more subregions of said region, wherein said selected subregion is not included in said set of subregions;

means for summing all of said market sizes for said set of subregions, thereby generating a total reported market size for said set of subregions;

means for subtracting said total reported market size for said set of subregions from said market size for said region, thereby generating a remaining market size for allocation;

means for determining a rated buying population for said selected subregion, based on actual preferences for products or services;

means for determining a rated buying population for the portion of said region not included in said set of subregions, based on actual preferences for products or services;

means for dividing said rated buying population for said selected subregion by said rated buying population for said portion of said region not included in said set of subregions, thereby generating a market allocation fraction;

means for multiplying said market allocation fraction by said remaining market size for allocation, thereby generating a market size for said selected subregion; and means for outputting said market size for said selected subregion, which aids in marketing products or services.

72. The apparatus of claim 71 wherein said means for determining a rated buying population for said selected subregion comprises:

means for determining a rated buying population for each market factor in a set of one or more market factors; and means for summing all of said rated buying populations for said set of market factors, thereby generating a rated buying population for said selected subregion.

73. The apparatus of claim 72 wherein said means for determining a rated buying population for each market factor comprises:

means for determining a rated buying population for each category in a set of categories for said market factor; and means for summing all of said rated buying populations for said set of categories for said market factor, thereby generating a rated buying population for said market factor.

74. The apparatus of claim 73 wherein said means for determining a rated buying population for each category comprises:

means for storing a population for said category;

means for storing a propensity-to-buy rating for said category; and means for multiplying said population for said category by said propensity-to-buy rating for said category, thereby generating a rated buying population for said category.

75. The apparatus of claim 74 wherein said means for determining a rated buying population for each market factor further comprises:

means for weighting said rated buying population for said market factor by multiplying by a weighting coefficient for said market factor.

76. The apparatus of claim 75 wherein said means for determining a rated buying population for said selected subregion further comprises:

means for weighting said rated buying population for said selected subregion by multiplying by a weighting coefficient for said selected subregion.

77. The apparatus of claim 76 wherein said means for determining a rated buying population for the portion of said region not included in said set of subregions comprises:

means for determining a rated buying population for each subregion in said region not included in said set of subregions; and means for summing all of said rated buying populations for said subregions in said region not included in said set of subregions, thereby generating a rated buying population for the portion of said region not included in said set of subregions.

78. An apparatus for creating a database of market size data for a first set of one or more subregions of a region to aid in marketing products or services, said apparatus comprising:

means for storing a market size for said region and a market size for each subregion in a second set of one or more subregions of said region, wherein said first set of subregions and said second set of subregions are mutually exclusive;

means for summing all of said market sizes for said second set of subregions, thereby generating a total reported market size for said second set of subregions;

means for subtracting said total reported market size for said second set of subregions from said market size for said reigon, thereby generating a remaining market size for allocation;

means for determining a rated buying population for each subregion in said first set of subregions, based on actual preferences for products or services;

means for determining a rated buying population for the portion of said region not included in said second set of subregions, based on actual preferences for products or services;

means for dividing said rated buying populatioin for each subregion in said first set of subregions by said rated buying population for said portion of said region not included in said second set of subregions, thereby generating a set of market allocation fractions;

means for multiplying each market allocation fraction in said set of market allocation fractions by said remaining market size for allocation, thereby generating a set of market sizes for said first set of subregions;

means for accessibly storing said set of market sizes for said first set of subregions; and means for ouputting any market size in said set of market sizes for said first set of subregions, which aids in marketing products or services.

79. The apparatus of claim 78 wherein said means for determining a rated buying population for each subregion in said first set of subregions comprises:

means for determining a rated buying population for each market factor in a set of one or more market factors; and means for summing all of said rated buying populations for said set of market factors, thereby generating a rated buying population for said subregion.

80. The apparatus of claim 79 wherein said means for determining a rated buying population for each market factor comprises:

means for determining a rated buying population for each category in a set of categories for said market factor; and means for summing all of said rated buying populations for said set of categories for said market factor, thereby generating a rated buying population for said market factor.

81. The apparatus of claim 80 wherein said means for determining a rated buying population for each category comprises:

means for storing a population for said category;

means for storing a propensity-to-buy rating for said category; and means for multiplying said population for said category by said propensity-to-buy rating for said category, thereby generating a rated buying population for said category.

82. The apparatus of claim 81 wherein said means for determining a rated buying population for each market factor further comprises:

means for weighting said rated buying population for said market factor by multiplying by a weighting coefficient for said market factor.

83. The apparatus of claim 82 wherein said means for determining a rated buying population for each subregion in said first set of subregions further comprises:

means for weighting said rated buying population for said subregion by multiplying by a weighting coefficient for said subregion.

84. The apparatus of claim 83 wherein said means for determining a rated buying population for the portion of said region not included in said second set of subregions comprises:

means for determining a rated buying population for each subregion in said region not included in said second set of subregions; and means for summing all of said rated buying populations for said subregions in said region not included in said second set of subregions, thereby generating a rated buying population for the portion of said region not included in said second set of subregions.

85. A program storage device readable by machine, tangibly embodying a program of instructions executable by the machine to perform method steps for sizing a market in a selected subregion of a region to aid in marketing products or services, said method steps comprising:

storing a market size for said region and a market size for each subregion in a set of one or more subregions of said region, wherein said selected subregion is not included in said set of subregions;

summing all of said market sizes for said set of subregions, thereby generating a total reported market size for said set of subregions;

subtracting said total reported market size for said set of subregions from said market size for said region, thereby generating a remaining market size for allocation;

determining a rated buying population for said selected subregion, based on actual preferences for products or services;

determining a rated buying population for the portion of said region not included in said set of subregions, based on actual preferences for products or services;

dividing said rated buying population for said selected subregion by said rated buying population for said portion of said region not included in said set of subregions, thereby generating a market allocation fraction;

multiplying said market allocation fraction by said remaining market size for allocation, thereby generating a market size for said selected subregion; and outputting said market size for said selected subregion, which aids in marketing products or services.

86. The program storage device of claim 85 wherein said step of determining a rated buying population for said selected subregion comprises:

determining a rated buying population for each market factor in a set of one or more market factors; and summing all of said rated buying populations for said set of market factors, thereby generating a rated buying population for said selected subregion.

87. The program storage device of claim 86 wherein said step of determining a rated buying population for each market factor comprises performing the following steps for each market factor:
   determining a rated buying population for each category in a set of categories for said market factor; and
   summing all of said rated buying populations for said set of categories for said market factor, thereby generating a rated buying population for said market factor.

88. The program storage device of claim 87 wherein said step of determining a rated buying population for each category comprises performing the following steps for each category:
   storing a population for said category;
   storing a propensity-to-buy rating for said category; and
   multiplying said population for said category by said propensity-to-buy rating for said category, thereby generating a rated buying population for said category.

89. The program storage device of claim 88 wherein said step of determining a rated buying population for each market factor further comprises performing the following step for each market factor:
   weighting said rated buying population for said market factor by multiplying by a weighting coefficient for said market factor.

90. The program storage device of claim 89 wherein said step of determining a rated buying population for said selected subregion further comprises:
   weighting said rated buying population for said selected subregion by multiplying by a weighting coefficient for said selected subregion.

91. The program storage device of claim 90 wherein said step of determining a rated buying population for the portion of said region not included in said set of subregions comprises:
   determining a rated buying population for each subregion in said region not included in said set of subregions; and
   summing all of said rated buying populations for said subregions in said region not included in said set of subregions, thereby generating a rated buying population for the portion of said region not included in said set of subregions.

92. A program storage device readable by a machine, tangibly embodying a program of instructions executable by the machine to perform method steps for creating a database of market size data for a first set of one or more subregions of a region to aid in marketing products or services, said method steps comprising:
   storing a market size for said region and a market size for each subregion in a second set of one or more subregions of said region, wherein said first set of subregions and said second set of subregions are mutually exclusive;
   summing all of said market sizes for said second set of subregions, thereby generating a total reported market size for said second set of subregions;
   subtracting said total reported market size for said second set of subregions from said market size for said region, thereby generating a remaining market size for allocation;
   determining a rated buying population for each subregion in said first set of subregions, based on actual preferences for products or services;
   determining a rated buying population for the portion for said region not included in said second set of subregions, based on actual preferences for products or services;
   dividing said rated buying population for each subregion in said first set of subregions by said rated buying population for said portion of said region not included in said second set of subregions, thereby generating a set of market allocation fractions;
   multiplying each market allocation fraction in said set of market allocation fractions by said remaining market size for allocation, thereby generating a set of market sizes for said first set of subregions;
   accessibly storing said set of market sizes for said first set of subregions; and
   outputting any market size in said set of market sizes for said first set of subregions, which aids in marketing products or services.

93. The program storage device of claim 92 wherein said step of determining a rated buying population for each subregion in said first set of subregions comprises performing the following steps for each subregion in said first set of subregions:
   determining a rated buying population for each market factor in a set of one or more market factors; and
   summing all of said rated buying populations for said set of market factors, thereby generating a rated buying population for said subregion.

94. The program storage device of claim 93 wherein said step of determining a rated buying population for each market factor comprises performing the following steps for each market factor:
   determining a rated buying population for each category in a set of categories for said market factor; and
   summing all of said rated buying populations for said set of categories for said market factor, thereby generating a rated buying population for said market factor.

95. The program storage device of claim 94 wherein said step of determining a rated buying population for each category comprises performing the following steps for each category:
   storing a population for said category;
   storing a propensity-to-buy rating for said category; and
   multiplying said population for said category by said propensity-to-buy rating for said category, thereby generating a rated buying population for said category.

96. The program storage device of claim 95 wherein said step of determining a rated buying population for each market factor further comprises performing the following step for each market factor:
   weighting said rated buying population for said market factor by multiplying by a weighting coefficient for said market factor.

97. The program storage device of claim 96 wherein said step of determining a rated buying population for each subregion in said first set of subregions further comprises performing the following step for each subregion in said first set of subregions:
   weighting said rated buying population for said subregion by multiplying by a weighting coefficient for said subregion.

98. The program storage device of claim 97 wherein said step of determining a rated buying population for the portion of said region not included in said second set of subregions comprises:

determining a rated buying population for each subregion in said region not included in said second set of subregions; and summing all of said rated buying populations for said subregions in said region not included in said second set of subregions, thereby generating a rated buying population for the portion of said region not included in said second set of subregions.

99. An article of manufacture comprising a computer-usable medium having computer-readable program code means embodied in said medium for sizing a market in a selected subregion of a region to aid in marketing products or services, said computer-readable program code means comprising:

program code means for storing a market size for said region and a market size for each subregion in a set of one or more subregions of said region, wherein said selected subregion is not included in said set of subregions;

program code means for summing all of said market sizes for said set of subregions, thereby generating a total reported market size for said set of subregions;

program code means for subtracting said total reported market size for said set of subregions from said market size for said region, thereby generating a remaining market size for allocation;

program code means for determining a rated buying population for said selected subregion, based on actual preferences for products or services;

program code means for determining a rated buying population for the portion of said region not included in said set of subregions, based on actual preferences for products or services;

program code means for dividing said rated buying population for said selected subregion by said rated buying population for said portion of said region not included in said set of subregions, thereby generating a market allocation fraction;

program code means for multiplying said market allocation fraction by said remaining market size for allocation, thereby generating a market size for said selected subregion; and program code means for outputting said market size for said selected subregion, which aids in marketing products or services.

100. The article of manufacture of claim 99 wherein said program code means for determining a rated buying population for said selected subregion comprises:

program code means for determining a rated buying population for each market factor in a set of one or more market factors; and program code means for summing all of said rated buying populations for said set of market factors, thereby generating a rated buying population for said selected subregion.

101. The article of manufacture of claim 100 wherein said program code means for determining a rated buying population for each market factor comprises:

program code means for determining a rated buying population for each category in a set of categories for said market factor; and program code means for summing all of said rated buying populations for said set of categories for said market factor, thereby generating a rated buying population for said market factor.

102. The article of manufacture of claim 101 wherein said program code means for determining a rated buying population for each category comprises:

program code means for storing a population for said category;

program code means for storing a propensity-to-buy rating for said category; and program code means for multiplying said population for said category by said propensity-to-buy rating for said category, thereby generating a rated buying population for said category.

103. The article of manufacture of claim 102 wherein said program code means for determining a rated buying population for each market factor further comprises:

program code means for weighting said rated buying population for said market factor by multiplying by a weighting coefficient for said market factor.

104. The article of manufacture of claim 103 wherein said program code means for determining a rated buying population for said selected subregion further comprises:

program code means for weighting said rated buying population for said selected subregion by multiplying by a weighting coefficient for said selected subregion.

105. The article of manufacture of claim 104 wherein said program code means for determining a rated buying population for the portion of said region not included in said set of subregions comprises:

program code means for determining a rated buying population for each subregion in said region not included in said set of subregions; and program code means for summing all of said rated buying populations for said subregions in said region not included in said set of subregions, thereby generating a rated buying population for the portion of said region not included in said set of subregions.

106. An article of manufacture comprising a computer-usable medium having computer-readable program code emans embodied in said medium for creating a database of market size data for a first set of one or more subregions of a region to aid in marketing products or services, said computer-readable program code means comprising:

program code means for storing a market size for said region and a market size for each subregion in a second set of one or more subregions of said region, wherein said first set of subregions and said second set of subregions are mutually exclusive;

program code means for summing all of said market sizes for said second set of subregions, thereby generating a total reported market size for said second set of subregions;

program code means for determining a rated buying population for each subregion in said first set of subregions, based on actual preferences for products or services;

program code means for determining a rated buying population for the portion of said region not included in said second set of subregions, based on actual preferences for products or services;

program code means for determining a rated buying population for the portion of said region not included in said second set of subregions, based on actual preferences for products or services;

program code means for dividing said rated buying population for each subregion in said firsrt set of subregions by said rated buying population for said portion of said region not included in said second set of subregions, thereby generating a set of market allocation fractions;

program code means for multiplying each market allocation fraction in said set of market allocation fractions by said remaining market size for allocation, thereby generating a set of market sizes for said first set of subregions;

program code means for accessibly storing said set of market sizes for said first set of subregions; and program code means for outputting any market size in said set of market sizes for said first set of subregions, which aids in marketing products or services.

107. The article of manufacture of claim 106 wherein said program code means for determining a rated buying population for each subregion in said first set of subregions comprises:

program code means for determining a rated buying population for each market factor in a set of one or more market factors; and program code for summing all of said rated buying populations for said set of market factors, thereby generating a rated buying population for said subregion.

108. The article of manufacture of claim 107 wherein said program code means for determining a rated buying population for each market factor comprises:

program code means for determining a rated buying population for each category in a set of categories for said market factor; and program code means for summing all of said rated buying populations for said set of categories for said market factor, thereby generating a rated buying population for said market factor.

109. The article of manufacture of claim 108 wherein said program code means for determining a rated buying population for each category comprises:

program code means for storing a population for said category;

program code means for storing a propensity-to-buy rating for said category; and program code means for multiplying said population for said category by said propensity-to-buy rating for said category, thereby generating a rated buying population for said category.

110. The article of manufacture of claim 109 wherein said program code means for determining a rated buying population for each market factor further comprises:

program code means for weighting said rated buying population for said market factor by multiplying by a weighting coefficient for said market factor.

111. The article of manufacture of claim 110 wherein said program code means for determining a rated buying population for each subregion in said first set of subregions further comprises:

program code means for weighting said rated buying population for said subregion by multiplying by a weighting coefficient for said subregion.

112. The article of manufacture of claim 111 wherein said program code means for determining a rated buying population for the portion of said region not included in said second set of subregions comprises:

program code means for determining a rated buying population for each subregion in said region not included in said second set of subregions; and program code means for summing all of said rated buying populations for said subregions in said region not included in said second set of subregions, thereby generating a rated buying population for the portion of said region not included in said second set of subregions.

* * * * *

UNITED STATES PATENT AND TRADEMARK OFFICE
CERTIFICATE OF CORRECTION

PATENT NO. : 6,298,328 B1
DATED : October 2, 2001
INVENTOR(S) : Eileen M. Healy and Gregory T. Dunn It is certified that error appears in the above-identified patent and that said Letters Patent is hereby corrected as shown below:

Column 2,
Line 28, change "for a" to -- for --.

Column 9,
Line 24, change "maret" to -- market --.

Column 10,
Lines 30-42, after period, delete "means for" through "said subregion.".

Column 11,
line 40, change "maret" to -- market --.

Column 15,
Lines 1-7, after period, delete "program code means" through "said subregion.";
Line 66, change "embodiment" to -- embodied --;
Line 67, change "subregion" to -- subregions --.

Column 19,
Line 52, change "region in" to -- region to aid in --.

Column 21,
Line 18, change "reigon" to -- region --.

Column 22,
Line 30, change "by machine" to -- by a machine --.

UNITED STATES PATENT AND TRADEMARK OFFICE
CERTIFICATE OF CORRECTION

PATENT NO. : 6,298,328 B1
DATED : October 2, 2001
INVENTOR(S) : Eileen M. healy and Gregory T. Dunn It is certified that error appears in the above-identified patent and that said Letters Patent is hereby corrected as shown below:

Column 24,
Line 1, change "portion for" to -- portion of --.

Column 26,
Line 39, change "emans" to -- means --;
Line 52, after the semicolon, insert the element -- program code means for subtracting said total reported market size for said second set of subregions from said market size for said region, thereby generating a remaining market size for allocation; --;
Lines 61-64, delete "program code means" through "services;";
Line 66, change "firsrt" to -- first --.

Signed and Sealed this

Twenty-first Day of May, 2002

Attest:

Attesting Officer

JAMES E. ROGAN
Director of the United States Patent and Trademark Office